(12) United States Patent
Ivacko et al.

(10) Patent No.: US 8,548,663 B2
(45) Date of Patent: Oct. 1, 2013

(54) MAIN PUMP TO AUXILIARY PUMP HAND-OFF STRATEGY IN HYBRID ELECTRIC VEHICLE

(75) Inventors: Joseph Ivacko, Fenton, MI (US); Gurunath Kedar-Dongakar, Auburn Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 8 days.

(21) Appl. No.: 13/369,605

(22) Filed: Feb. 9, 2012

(65) Prior Publication Data

US 2013/0211637 A1  Aug. 15, 2013

(51) Int. Cl.
*B60W 20/00* (2006.01)
(52) U.S. Cl.
USPC .......................................... 701/22; 180/65.21
(58) Field of Classification Search
USPC ..................... 701/22; 180/65.1, 65.21, 65.26, 180/65.28, 65.285, 65.29, 65.31; 290/16, 290/50; 903/902, 906
See application file for complete search history.

(56) References Cited

U.S. PATENT DOCUMENTS

| | | | | |
|---|---|---|---|---|
| 6,116,363 A | * | 9/2000 | Frank | 180/65.25 |
| 6,376,927 B1 | * | 4/2002 | Tamai et al. | 290/40 C |
| 2006/0120876 A1 | | 6/2006 | Kitano et al. | |
| 2008/0064562 A1 | | 3/2008 | Zettel et al. | |
| 2009/0192685 A1 | | 7/2009 | Sime | |
| 2010/0303636 A1 | | 12/2010 | Tamai et al. | |
| 2013/0090798 A1 | * | 4/2013 | Fukushiro | 701/22 |

FOREIGN PATENT DOCUMENTS

EP    2055608 A2   5/2009

OTHER PUBLICATIONS

International Search Report dated May 7, 2013 for International Application No. PCT/US20131024930, International Filing Date Feb. 6, 2013.
Written Opinion dated May 7, 2013 for International Application No. PCT/US2013/024930, International Filing Date Feb. 6, 2013.

* cited by examiner

*Primary Examiner* — Mary Cheung
(74) *Attorney, Agent, or Firm* — Frederick A. Krieger

(57) ABSTRACT

A method and system of reducing an occurrence of hydraulic pressurization loss during the transition from gas-powered engine operation to electric motor operation in a hybrid electric vehicle. The method includes maintaining operation of the gas-powered engine while initiating an auxiliary pump with its associated electric motor. A master timer is initiated. Once the auxiliary pump exceeds a minimum speed threshold, a delay time period is determined during which operation of the auxiliary pump is tested. If the auxiliary pump does not stall during the delay time period and the master timer has not yet expired, the gas-powered engine is allowed to shut-off.

14 Claims, 5 Drawing Sheets

MAIN PUMP TO AUXILIARY PUMP HAND-OFF STRATEGY IN HYBRID ELECTRIC VEHICLE

FIELD

The present disclosure relates to systems and methods for operating a hybrid electric vehicle transmission, and more particularly to systems and methods for preventing loss of hydraulic pressurization during an initialization of the vehicle's electric propulsion mode.

BACKGROUND

A hybrid electric vehicle alternates between gas-powered engine operation and electric motor operation. The transition from operating the vehicle in a gas-powered mode to operating the vehicle in an electric mode, and vice versa, occurs while the vehicle is being used. Therefore, an effective transition from operation in one mode to another is imperative so that no loss of vehicle function or control occurs during the vehicle operation. For example, when transitioning from gas-powered operation to electric mode operation, care must be taken to ensure that the vehicle's electric mode operation is fully functional before shutting down the vehicle's gas-powered engine.

Currently, however, the potential for ineffective transitioning between operating modes exists. Specifically, problems may occur in transitioning between use of the gas-powered engine to pump transmission fluid and an auxiliary transmission fluid pump in the electric mode. In an advanced hybrid system truck ("AHS-T") hybrid transmission, an auxiliary pump provides pressurization of transmission fluid when the vehicle is in electric mode. The main pump driven by the gas-powered engine itself provides transmission fluid pressurization when the vehicle is in a gas-powered mode. During the transition from gas-powered engine propulsion to electric propulsion, the auxiliary pump is activated and the gas-powered engine (including the main pump) is allowed to shut down. Unfortunately, conventional hybrid transmissions are susceptible to prematurely shutting down the gas-powered engine before the auxiliary pump is fully operational. Specifically, during cold ambient temperatures or cold transmission fluid temperature conditions, the auxiliary pump is prone to stall during its initial activation stage. When this happens, the vehicle may lose power and control. The consequences of the power failure range from simple inconvenience to unacceptably dangerous. Therefore, systems and methods that ensure a proper transition from gas-powered engine operation to electric motor operation are clearly desirable.

SUMMARY

In one form, the present disclosure provides a method of reducing an occurrence of hydraulic pressurization loss during the transition from gas-powered engine operation to electric motor operation in a hybrid electric vehicle. The method includes maintaining operation of the gas-powered engine while initiating an auxiliary pump with its associated electric motor. A master timer is initiated. Once the auxiliary pump exceeds a minimum speed threshold, a delay time period is determined during which operation of the auxiliary pump is tested. If the auxiliary pump does not stall during the delay time period and the master timer has not yet expired, the gas-powered engine is allowed to shut-off.

In another form, the present disclosure provides an auxiliary pump system in a hybrid electric vehicle. The system includes an auxiliary pump with an associated electric motor and is configured to maintain hydraulic pressurization in the hybrid electric vehicle's transmission system during a transition from operation of the hybrid electric vehicle's gas-powered engine to the hybrid electric vehicle's electric motor. The system also includes a processor configured to determine the auxiliary pump speed, control the auxiliary pump and shut-off of the gas-powered engine during a transition between vehicle operation in a gas-powered engine mode and vehicle operation in an electric motor mode. The processor control includes instructions for initiating an auxiliary pump with its associated electric motor while the gas-powered engine is running and providing hydraulic pressurization. The processor control also includes instructions for initiating a master timer. Once the auxiliary pump exceeds a minimum speed threshold, a delay time period is determined during which operation of the auxiliary pump is tested. If the auxiliary pump does not stall during the delay time period and the master timer has not yet expired, the gas-powered engine is allowed to shut-off.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
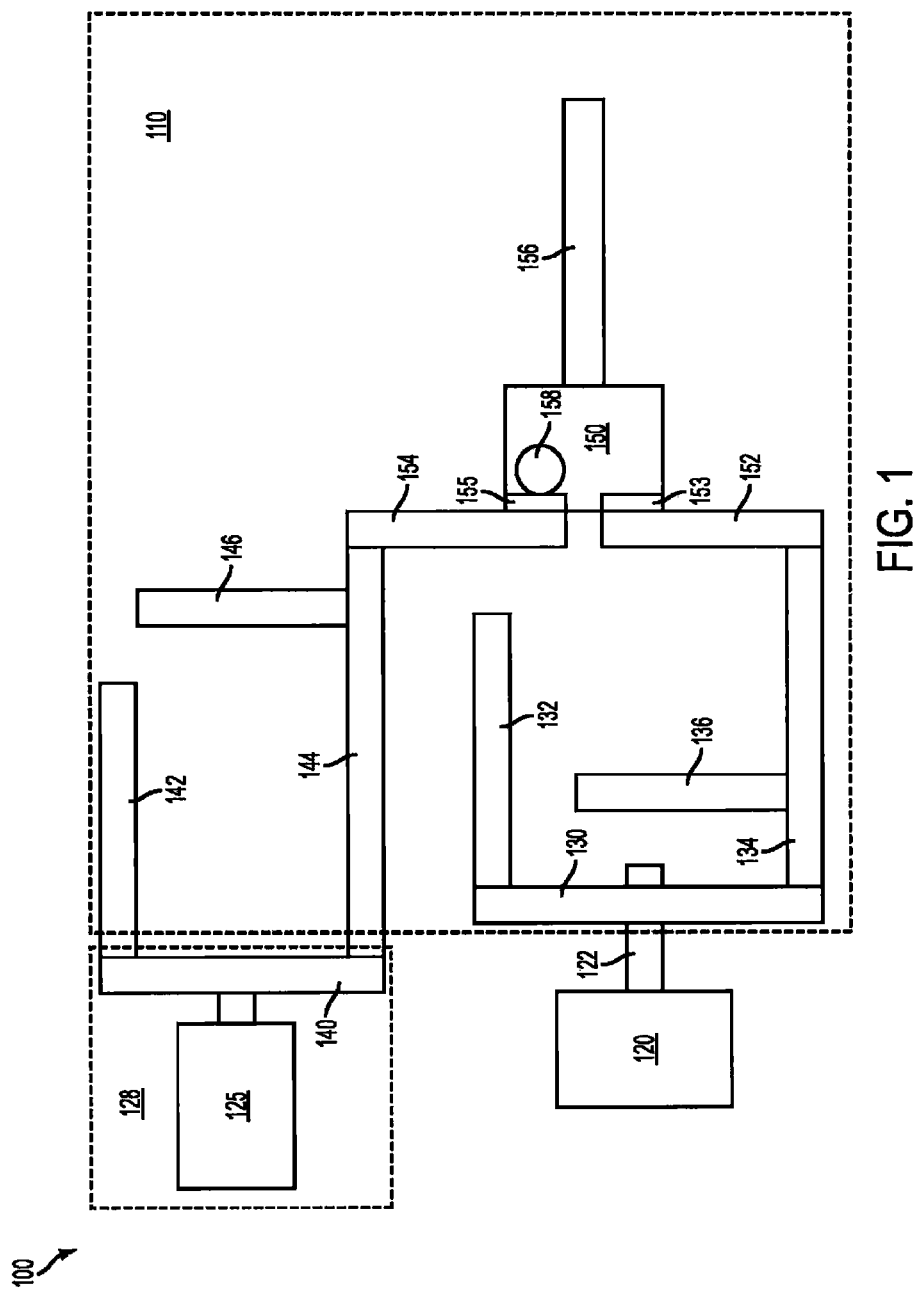
FIG. 1 is a block diagram of the mechanical and hydraulic layout of a hybrid electric vehicle according to the principles of the present disclosure.

The mechanical and hydraulic layout 100 of a hybrid transmission are illustrated in FIG. 1. As indicated in the layout 100, a gas-powered engine 120 turns a crankshaft 122. Attached to the crankshaft 122 and inside a transmission case 110 is a main pump impeller 130. Oil from a sump enters the main pump impeller 130 at an input 132 and exits as pressurized oil at output 134. An exhaust port 136 is coupled to the pressurized output 134. The pressurized oil exits the transmission case 110 after passing through a check valve 150, as explained below.

An alternative oil flow path dependent on an electric motor is also illustrated in the layout 100 of FIG. 1. An auxiliary pump 128 includes an electric motor 125 and an impeller 140. The electric motor 125 is powered by a battery and functions to pump oil from a sump into an auxiliary pump impeller 140 via an input 142. The oil is pressurized by the auxiliary pump impeller 140 and is output via output 144 to the check valve 150. An exhaust port 146 is coupled to the pressurized output 144.

The check valve 150 includes two input ports 152, 154 and an output port 156. Both input ports 152, 154 include a check ball seat 153, 155, respectively. The check ball seat 153, 155 is for positioning a check ball 158. The check ball 158 "checks" or stops the flow of oil from an input port 152, 154 unless the inflow exceeds a minimum pressure threshold. Therefore, when gas-powered engine 120 is operating and pressurizing the hydraulic system, and while the electric motor 125 is off, the check ball 158 is displaced from the check ball seat 153 of input port 152 because the oil pumped by the engine 120 is sufficiently pressurized. Alternatively, when the electric motor 125 is operating and pressurizing the hydraulic system via the auxiliary pump 128, and while the gas-powered engine 120 is off, the check ball 158 is displaced from the check ball seat 155 of input port 154 because the oil pumped by the auxiliary pump 128 is sufficiently pressurized. During a transition from gas-powered engine operation to electric motor operation, there may be a period of time when both the gas-powered engine 120 is operating and the electric motor 125 is operating. During this overlap period, the check ball 158 is displaced from both check ball seats 153, 155.

Figure 2:
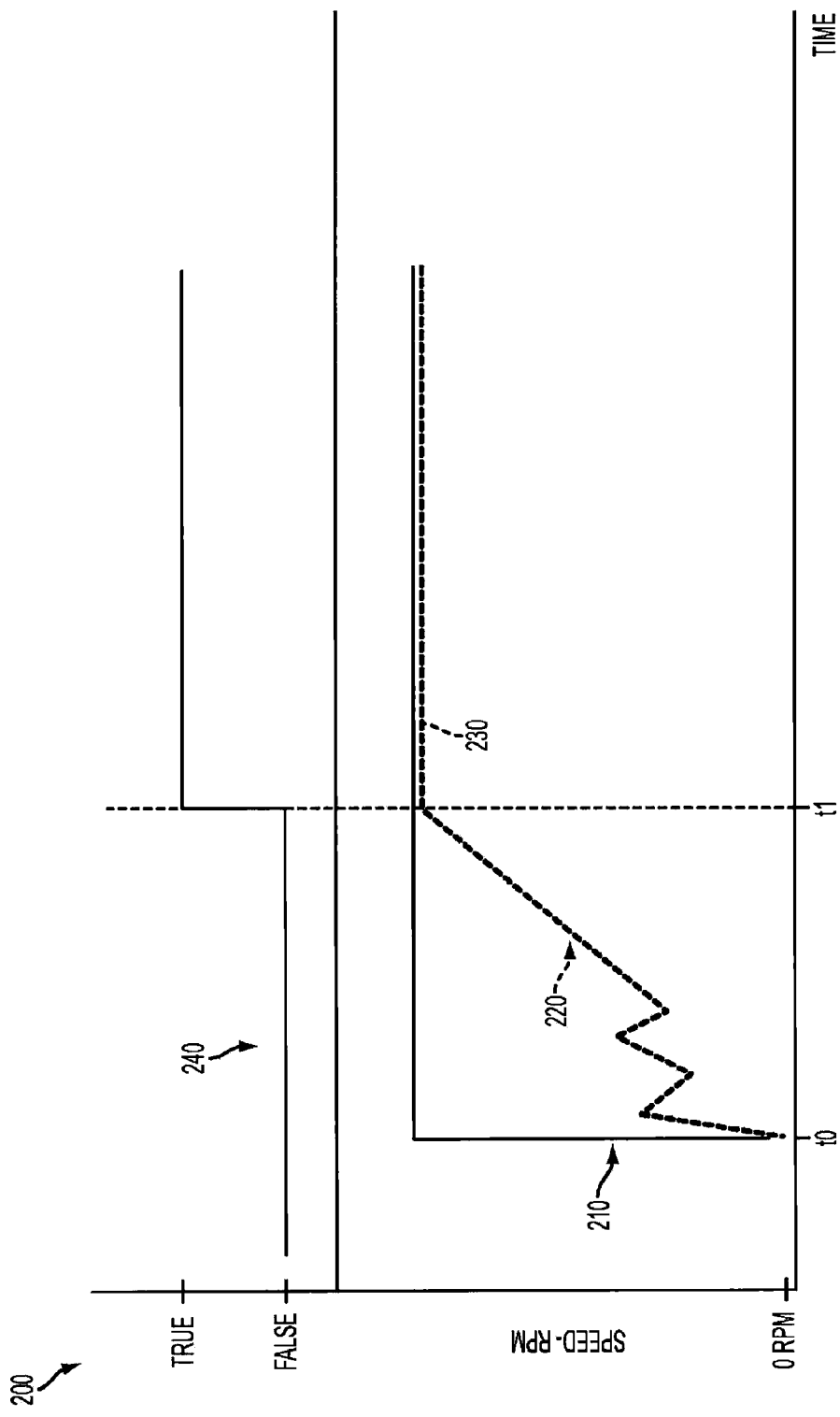
FIG. 2 is a timeline of a traditional main pump to auxiliary pump hand-off strategy in a hybrid electric vehicle.

A timeline 200 illustrating a conventional transition from vehicle operation using a gas-powered engine to vehicle operation using an electric motor is illustrated in FIG. 2. At a point in time t0, the auxiliary pump is turned on. Ideally, at time t0, the speed 210 of the auxiliary pump is instantly at its desired speed. However, in reality, the auxiliary pump must ramp up in speed 220 until the auxiliary pump attains the desired speed 230. In FIG. 2, the auxiliary pump doesn't attain its desired speed 230 until time t1. Under the conventional timeline 200, once the auxiliary pump attains its desired speed 230 at time t1, a flag 240 switches from FALSE to TRUE, indicating that the auxiliary pump is running. As soon as the auxiliary pump running flag 240 switches to TRUE, the gas-powered engine is shut-off, relegating all vehicle control to the auxiliary pump with electric motor.

Unfortunately, during cold ambient conditions, there is a significant chance that the auxiliary pump could stall in the first few moments of operation, even after it first attains the desired operating speed. In the conventional timeline 200, if the auxiliary pump stalls after it has first attained the desired operating speed (i.e., after the gas-powered engine has already shut down), the vehicle will be left without power and/or control.

To remedy this cold temperature likelihood, a new timing and hand-off strategy is disclosed herein. The strategy includes the introduction of a delay integral into the time period during which both the gas-powered engine and the electric motor are running simultaneously.

Figure 3:
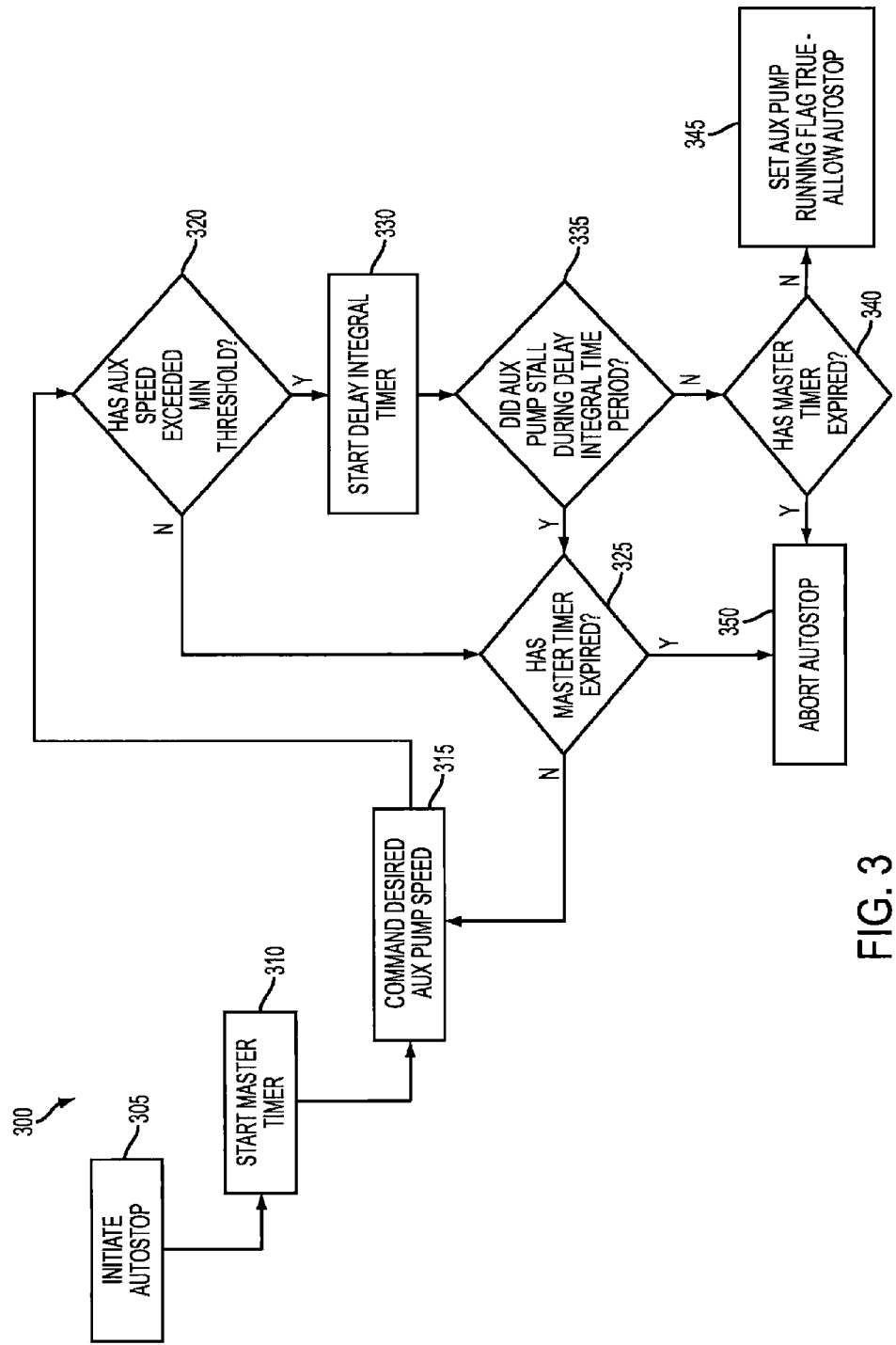
FIG. 3 is a method of a main pump to auxiliary pump hand-off strategy in a hybrid electric vehicle according to the principles of the present disclosure.

FIG. 3 illustrates a method 300 for an improved main pump to auxiliary pump hand-off strategy suitable to solve the problems under cold ambient temperature conditions. Method 300 may be implemented in a hybrid transmission whenever a need exists to transition from gas-powered engine operation to electric motor operation. When such a need exists, an autostop routine is initiated for the shut-down of the gas-powered engine (block 305). Upon initiation, a master timer is started (block 310). The master timer indicates a window of time during which either the auxiliary pump must become fully operational, as described below, or the autostop sequence must be halted. Additionally, a desired auxiliary pump speed is set (block 315). The specific desired auxiliary pump speed may depend on various operating conditions and may be set with reference to a lookup table, for example.

The auxiliary pump speed is checked at block 320. As long as the master timer has not yet expired (block 325), a check is periodically made to determine whether the auxiliary pump speed has exceeded a minimum threshold (block 320). Because start-up noise and other speed oscillations could prematurely exceed the minimum threshold, the auxiliary pump speed is low-pass filtered so as to remove the effect of high-frequency noise and oscillations. Thus, it is the filtered auxiliary pump speed that is periodically monitored to determine whether a minimum threshold has been exceeded. The minimum threshold is generally a percentage of the desired auxiliary pump speed (as established in block 315).

If, during the periodic check to determine whether the auxiliary pump speed has exceeded the set minimum threshold (block 320), the minimum threshold is exceeded, a delay integral timer is started (block 330). The delay integral is a function of both transmission temperature and ambient temperature. The delay integral determines a time period after the minimum threshold speed has been exceeded during which the auxiliary pump is most likely to stall. As an example, the delay integral may be a quadratic interpolation of a surface defined by the transmission fluid temperatures and the ambient temperatures. In general, colder temperatures result in a greater delay integral value.

If the auxiliary pump stalls at any time during the delay integral time period (block 335), an evaluation is made whether the master timer has expired (block 325). If the master timer has not yet expired, then the desired auxiliary pump speed is reset (block 315) and the method 300 waits for the auxiliary pump speed to once again exceed the determined minimum threshold (block 320). Once the minimum threshold is exceeded, the delay integral timer is started again (block 330). Additional stalls of the auxiliary pump during the delay integral time period result in the same loop being repeated as long as the master timer has not yet expired (blocks 335, 325).

If the auxiliary pump does not stall during the delay integral time period (block 335), then a final evaluation is performed to determine whether the master timer has expired (block 340). If the master timer has not yet expired, then the auxiliary pump running flag is set to TRUE, thus allowing the gas-powered engine to stop, thereby completing the autostop process (block 345). If, however, the master timer expires at any time before the auxiliary pump running flag is set to TRUE, the autostop process is aborted (block 350).

Figure 4:
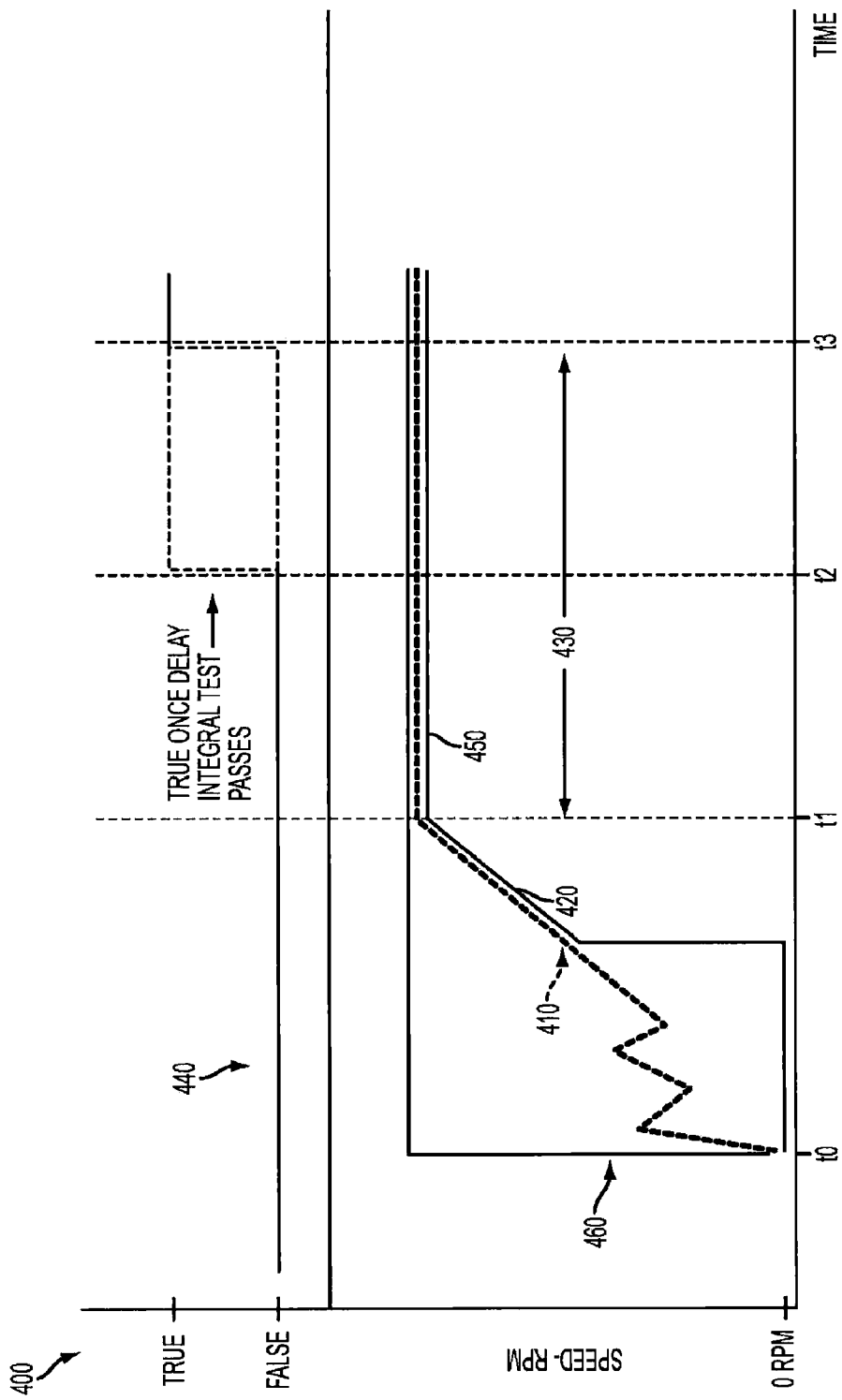
FIG. 4 is a timeline of a main pump to auxiliary pump hand-off strategy in a hybrid electric vehicle according to the principles of the present disclosure.

FIG. 4 illustrates a timeline 400 of the improved main pump to auxiliary pump hand-off strategy. In timeline 400, the autostop process wherein the auxiliary pump begins operation is initiated at time t0. At time t0, the auxiliary pump running flag 440 remains at a FALSE setting, meaning that the gas-powered engine must remain running. Ideally, upon start-up of the auxiliary pump, the auxiliary pump immediately achieves the desired auxiliary pump speed 460. In reality, however, the auxiliary pump requires some time to achieve the desired auxiliary pump speed. The auxiliary pump speed 410 is monitored to determine if the speed exceeds a minimum threshold 450. To reduce the effects of start-up and other noise, the auxiliary pump speed is low-pass filtered 420. The filtered auxiliary pump speed 420 initially exceeds the determined minimum threshold 450 at time t1.

As noted above in method 300, when the autostop process begins at time t0, a master timer begins. The master timer defines a maximum time period during which the auxiliary pump is allowed to demonstrate full operation. The maximum time period extends from time t0 to time t3. A master time window 430, during which full operation of the auxiliary pump may be demonstrated, extends from time t1 to time t3.

Demonstration of full operation of the auxiliary pump requires that the auxiliary pump not stall during the delay integral time period within the master time window 430. If the auxiliary pump operates for the extent of the delay integral time period and does not stall, and the delay integral time period ends at time t2 within the master time window 430, then the auxiliary pump is presumed to be fully operational and the auxiliary pump running flag 440 is set to TRUE. If, however, the auxiliary pump stalls at any time during the extent of the delay integral time period, the delay integral time period is reinitiated and the auxiliary pump is re-tested for operation during a fresh delay integral time period. As long as the auxiliary pump can demonstrate full operation (by not stalling during a complete delay integral time period) within the master time window 430, the auxiliary pump running flag 440 will be set to TRUE at time t2. If, however, the auxiliary pump fails to pass the delay integral time period tests within the master time window 430 (i.e., before time t3), the autostop process is canceled and the auxiliary pump running flag 440 is maintained as FALSE.

Therefore, by introducing a delay based on ambient and transmission fluid temperature, the occurrence of hydraulic pressurization loss during the transition from gas-powered engine operation to electric motor operation in a hybrid electric vehicle is greatly reduced.

Figure 5:
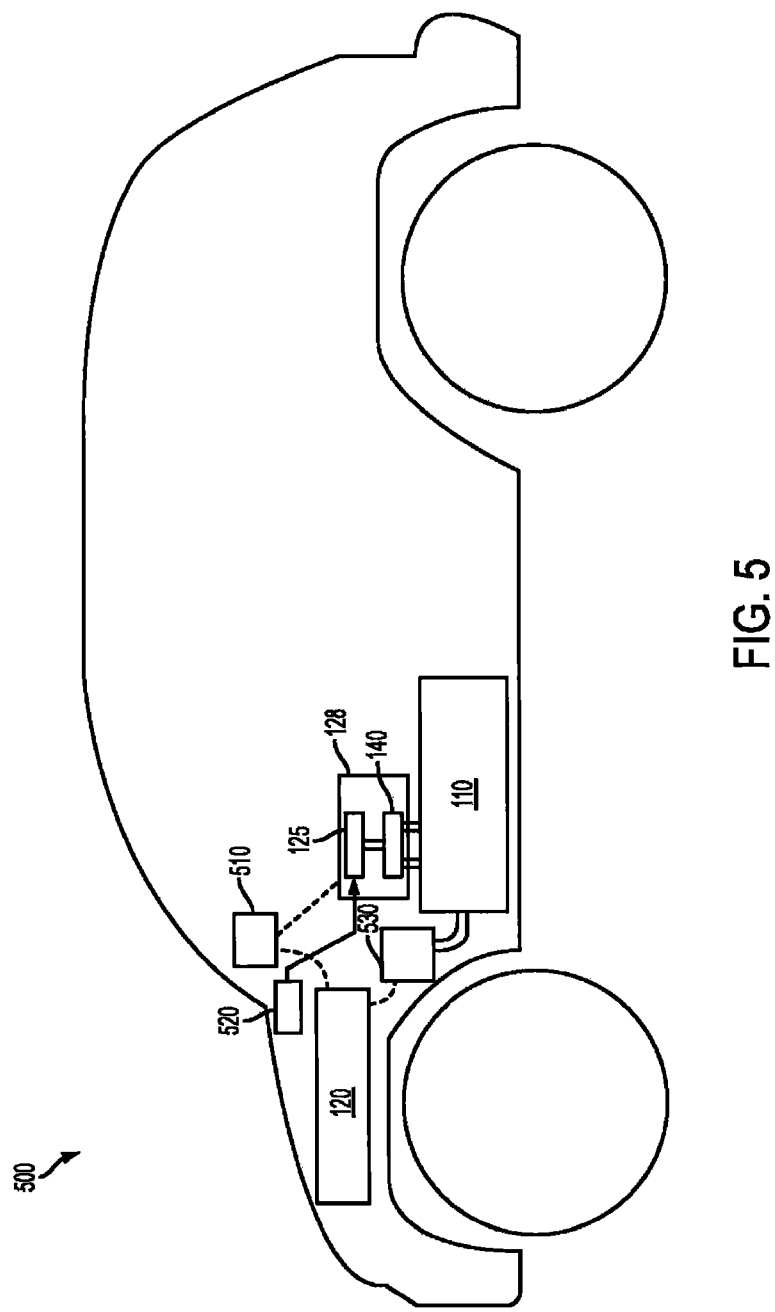
FIG. 5 is a block diagram of a hybrid electric vehicle according to the principles of the present disclosure.

FIG. 5 illustrates a hybrid electric vehicle 500 that includes the transmission case 110 and the coupled gas-powered engine 120 and the auxiliary pump 128 with its associated electric motor 125 and auxiliary pump impeller 140. A processor 510 controls the operation of the gas-powered engine 120 and the auxiliary pump 128. The processor 510 is configured to determine the speed of the auxiliary pump 128 and to output control signals to the gas-powered engine 120 and the auxiliary pump 128, in accordance with the timeline 400 of FIG. 4 and the method 300 of FIG. 3. Also shown is a 12V battery 520, for example, powering the auxiliary pump 128. A main pump 530 powered by the gas-powered engine 120 is also coupled to the transmission 110.

What is claimed is:

1. A method of reducing an occurrence of hydraulic pressurization loss during the transition from gas-powered engine operation to electric motor operation in a hybrid electric vehicle, the method comprising:
   initiating an auxiliary pump with a battery-powered electric motor while the gas-powered engine is running and providing hydraulic pressurization;
   initiating a master timer;
   once the auxiliary pump exceeds a minimum speed threshold, determining a delay time period during which operation of the auxiliary pump is tested; and
   if the auxiliary pump does not stall during the delay time period and the master timer has not yet expired, allowing the gas-powered engine to shut-off.

2. The method of claim 1, wherein the delay time period is determined with relation to transmission fluid temperature and ambient temperature.

3. The method of claim 1, wherein the delay time period is determined as a value of a quadratic interpolation of a surface defined by transmission fluid temperatures and ambient temperatures.

4. The method of claim 1, further comprising determining a desired auxiliary pump speed.

5. The method of claim 4, wherein the minimum speed threshold is a percentage of the desired auxiliary pump speed.

6. The method of claim 1, further comprising reinitiating the delay time period if the auxiliary pump does stall during the delay time period and the master timer has not yet expired.

7. The method of claim 1, further comprising maintaining operation of the gas-powered engine if the auxiliary pump does stall during the delay time period and the master timer has already expired.

8. An auxiliary pump system in a hybrid electric vehicle, the system comprising:
   an auxiliary pump with an associated electric motor, the auxiliary pump being configured to maintain hydraulic pressurization in the hybrid electric vehicle's transmission system during a transition from operation of the hybrid electric vehicle's gas-powered engine to the hybrid electric vehicle's electric motor; and
   a processor configured to determine the auxiliary pump speed and to control the auxiliary pump and shut-off of the gas-powered engine during a transition between vehicle operation in a gas-powered engine mode and vehicle operation in an electric motor mode, said processor control comprising instructions for:
     initiating the auxiliary pump while the gas-powered engine is running and providing hydraulic pressurization;
     initiating a master timer;
     once the auxiliary pump exceeds a minimum speed threshold, determining a delay time period during which operation of the auxiliary pump is tested; and
     if the auxiliary pump does not stall during the delay time period and the master timer has not yet expired, allowing the gas-powered engine to shut-off.

9. The auxiliary pump system of claim 8, wherein the processor control instructions further comprise determining the delay time period with relation to transmission fluid temperature and ambient temperature.

10. The auxiliary pump system of claim 8, wherein the processor control instructions further comprise determining the delay time period to be a value of a quadratic interpolation of a surface defined by transmission fluid temperatures and ambient temperatures.

11. The auxiliary pump system of claim 8, wherein the processor control instructions further comprise determining a desired auxiliary pump speed.

12. The auxiliary pump system of claim 11, wherein the minimum speed threshold is a percentage of the desired auxiliary pump speed.

13. The auxiliary pump system of claim 8, wherein the processor control instructions further comprise reinitiating the delay time period if the auxiliary pump does stall during the delay time period and the master timer has not yet expired.

14. The auxiliary pump system of claim 8, wherein the processor control instructions further comprise maintaining operation of the gas-powered engine if the auxiliary pump does stall during the delay time period and the master timer has already expired.

* * * * *